A. A. WINER.
AUTOMOBILE RUNWAY AND LIFT.
APPLICATION FILED FEB. 19, 1915.
1,174,922.
Patented Mar. 7, 1916.
3 SHEETS—SHEET 3.
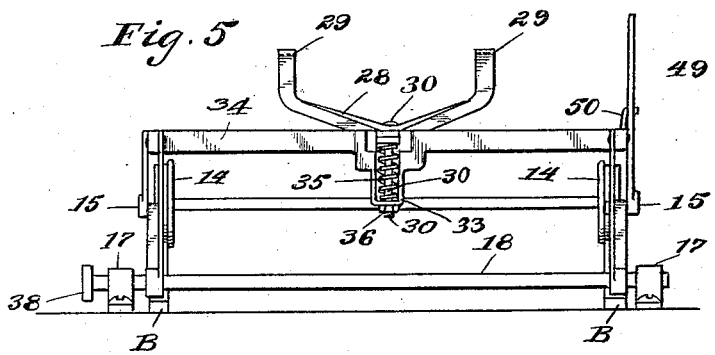
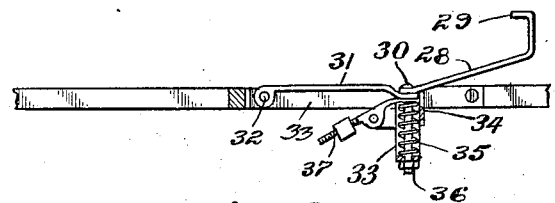
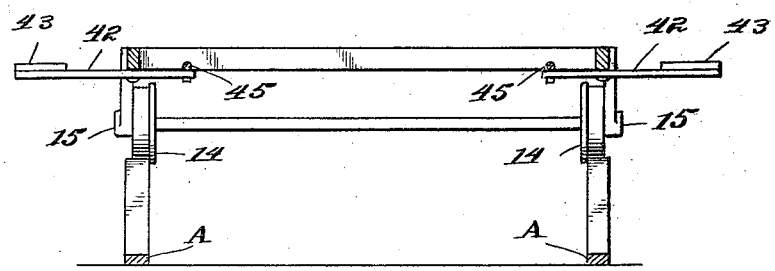
Witnesses
Inventor
Andrew A. Winer,
By Victor J. Evans
Attorney

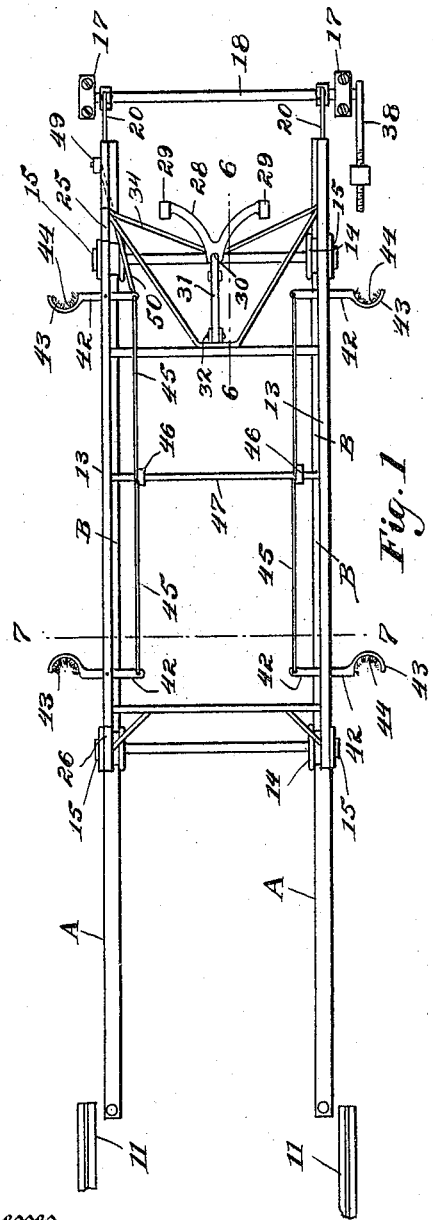

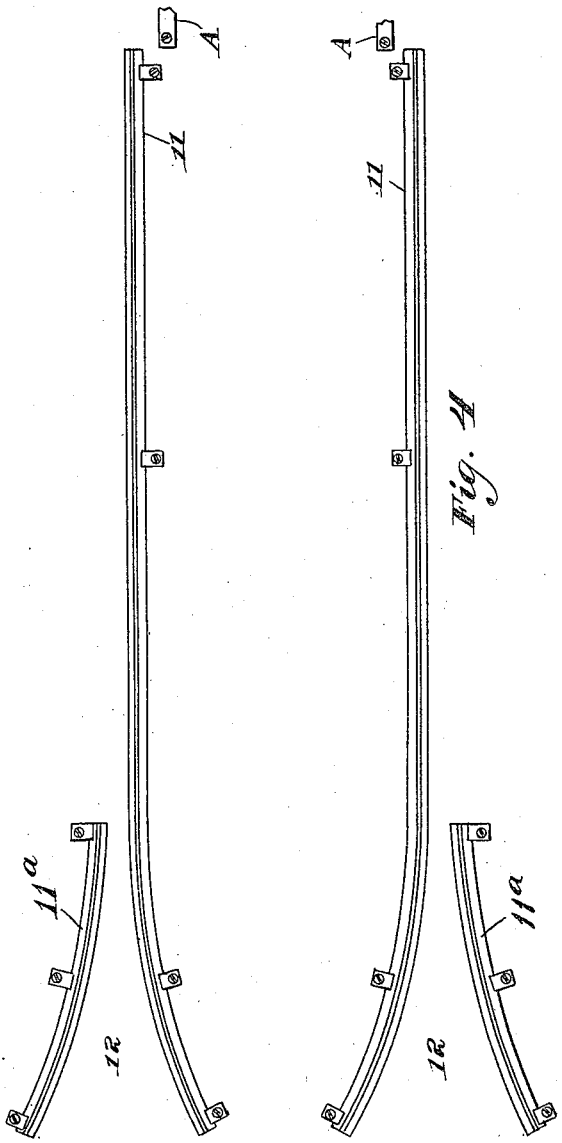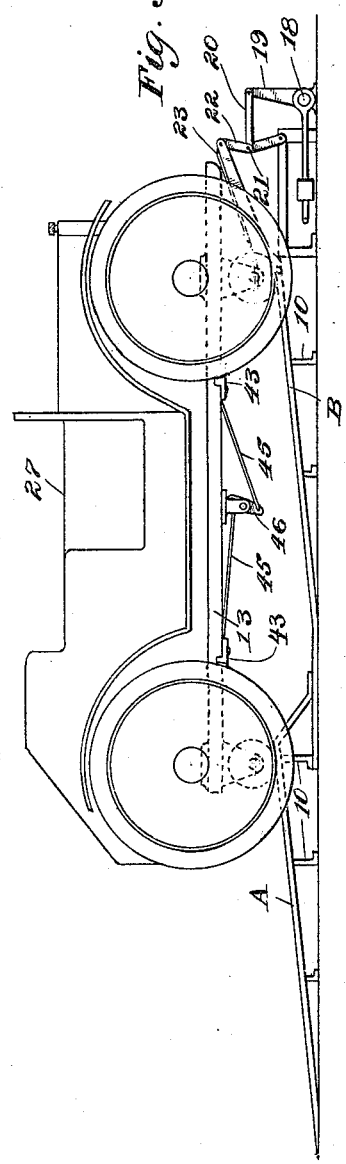

UNITED STATES PATENT OFFICE.

ANDREW A. WINER, OF OCALA, FLORIDA.

AUTOMOBILE RUNWAY AND LIFT.

1,174,922. Specification of Letters Patent. Patented Mar. 7, 1916.

Application filed February 19, 1915. Serial No. 9,413.

*To all whom it may concern:*

Be it known that I, ANDREW A. WINER, a citizen of the United States, residing at Ocala, in the county of Marion and State of Florida, have invented new and useful Improvements in Automobile Runways and Lifts, of which the following is a specification.

The invention relates to vehicle runways, and more particularly to the class of automobile runways and lifts.

The primary object of the invention is the provision of a device of this character wherein an automobile will be guided into a garage and automatically elevated so as to relieve the tires from the weight thereof, as well as protecting such tires from oil or grease upon the foundation or flooring of the garage or the like, thereby arresting movements of the automobile and assuring longer life to the tires.

Another object of the invention is the provision of a device of this character wherein safety is assured in driving the automobile into and out of the garage or the like, and at the same time facilitating the entrance and exit to and from the same.

A further object of the invention is the provision of a device of this character wherein the tires of an automobile can be readily and easily cleaned when the said automobile is at rest upon the stand or support which serves to hold it in the same position within the garage or the like at all times, and in this manner economizing in space therein.

A still further object of the invention is the provision of a device of this character which is simple in construction, novel in form, reliable, efficient, and automatically operated, strong, durable, and inexpensive in manufacture and installation.

With these and other objects in view, the invention consists in the construction, combination and arrangement of parts as will be hereinafter fully described, illustrated in the accompanying drawings, and pointed out in the claims hereunto appended.

In the drawings: Figure 1 is a top plan view of a device constructed in accordance with the invention. Fig. 2 is a side elevation showing by dotted lines the initial position of the carriage or truck, and by full lines the final position thereof. Fig. 3 is a similar view showing the carriage or truck supporting an automobile in lifted position with the wheels out of contact with the foundation or flooring of the garage or the like. Fig. 4 is a plan view of the runway with the track for the carriage or truck. Fig. 5 is an end elevation of the device. Fig. 6 is a longitudinal sectional view therethrough. Fig. 7 is a vertical transverse sectional view on the line 7—7 of Fig. 1.

Similar reference characters indicate corresponding parts throughout the several views in the drawings.

Referring to the drawings in detail, A and B designate the respective front and rear pairs of inclined rails of a track, the inclines of the said rails being in the same direction, and these rails are fixed to the floor of a garage or the like through the medium of brackets 10, the inclination of the rails being in the direction of the entrance to the said garage or the like. Spaced from and at the outer sides of the front rails A are guide rails 11 which are suitably fixed to the foundation or flooring of the garage or the like, while coöperating with the front ends of said rails 11 are additional rails 11$^a$, these rails, together with the rails 11, being in divergent relation to each other to afford a wide entrance to the runways 12 between the said rails for the wheels of an automobile when driven into the garage or the like.

Movable over the track, that is to say, the rails A and B is a carriage or truck 13 having the flanged wheels 14 journaled in bearings 15 on the said carriage or truck, the said wheels 14 being movable over the front and rear rails A and B of the said track for a purpose presently described.

Swingingly connected to the elevated ends of the rear rails B is a platform 16, while mounted upon the foundation or floor beyond the said elevated end of the rear rails B are bearings 17 in which is journaled a rocking shaft 18, the same having fixed thereto cranks 19 to which are pivoted throw rods 20, the same being pivoted to the pivotal break joints 21 of raising and lowering links 22 which are also pivoted respectively to the platform 16 and the rear rails 10 of the track, it being seen that on turning the shaft 18 in one direction the links 22 will be moved to elevate the platform 16, while on movement of the shaft 18 in the reverse direction the links will be moved to lower the said platform for a purpose presently described.

Suitably secured to the upper face of the platform 16 is a friction sheet 23, preferably leather, and on the raising of this platform the same will be brought into contact with the rear end of the truck or carriage 13 when shifted rearwardly on the rear rails B, thereby holding the truck in its elevated position, as the wheels 14 thereof have traveled on to the highest or elevated points of both the front and rear rails A and B, respectively.

Formed on the carriage or truck 13 near the front and rear ends thereof are bearings providing front and rear axle seats 25 and 26, respectively, to accommodate the axle of an automobile 27, which when driven into the garage or the like the wheels thereof will be guided in the runways 12 onto the carriage or truck 13, which is initially in lowered position and located at the front end of the track.

Arranged upon the carriage or truck 13 at the rear end portion thereof is a grab device which comprises a forked member 28 formed at the ends of its limbs with upstanding hooks 29 which project above the frame of the carriage or truck 13 for engagement with the front axle of the automobile when run on to said carriage or truck 13 so that the latter will move simultaneously with the automobile for the travel of the truck or carriage upwardly upon the rails A and B of the track. The forked member 28 is provided for lateral swinging movement upon a bolt 30 which serves to connect the said member with a vertical swinging arm 31 pivoted at 32 centrally of the carriage or truck 13. The bolt 30 is mounted for vertical adjustment within a yoke 33 supported by and depending from a suitable brace 34 of the carriage or truck 13, and surrounding this bolt 30 is a coiled expansion spring 35 which is located in the yoke 33 and rests upon the closed end of the latter, while threaded on the bolt 30 is an adjusting nut 36 so that the arm 31 and the forked member 28 can be readily adjusted. Pivoted beneath the arm 31 is a weighted rocking lever 37 which has one end surrounding the bolt 30, and against which acts the upper end of the spring 35 so as to coöperate with the weight of the lever 37 for holding the arm 31 normally raised for sustaining the member 28 in a position whereby the hook end 29 will engage the front axle of the automobile when run upon the carriage or truck 13, thereby connecting the latter and the automobile together so that the same will move with each other, and as the truck 13 travels upwardly on the tracks A and B the automobile will be automatically lifted so as to bring the tires on the wheels thereof out of contact with the foundation or floor of the garage or the like.

The shaft 18 has fixed thereto a weighted arm 38 which serves to automatically effect the lifting of the platform 16 so that the same will be in a position to frictionally engage with the rear end of the truck when the same has traveled onto the elevated points of the front and rear rails A and B so as to hold the truck elevated, and thereby elevate the automobile. Suitably mounted overhead within the garage or the like are guide pulleys 39 over which is trained a pull cable 40, the same being connected to the weighted arm 38, and also connected to this cable is a handle 41 which depends in convenient reach of the operator of the automobile when run onto the carriage or truck 13 and the same has moved to a position for elevating the said automobile so that the operator can release the truck by pulling upon the cable 40 and thereby permit the said carriage or truck to travel down the inclined rails A and B for the lowering of the automobile when it is desired that the same is to be driven from the garage or the like.

Pivotally mounted on the truck or carriage 13 at the opposite longer sides thereof are swinging levers or arms 42, on the outer ends of which are semi-cylindrical shaped brush stocks 43 carrying tufted bristles 44, and these stocks 43 are adapted to embrace the tires of the automobile when the arms or levers 42 are thrown into a position for accomplishing this, so that on the turning of the wheels the said tires may be readily and quickly cleaned without undue labor. The inner ends of the arms or levers 42 are respectively connected to operating rods 45 which are also pivoted to oppositely extending cranks 46 fixed to a shaft 47 which is journaled in suitable bearings 48 mounted on and depending from the bottom of the carriage or truck, the shaft 47 being rocked on actuating a throw lever 49 pivoted to the read end of the carriage or truck 13, and this lever is connected through the medium of the rod 50 with one of the levers 42. It will be seen that when the lever 49 is thrown in one direction the brushes on the arms 42 will be brought into embracing engagement with the tires of the automobile when supported upon and elevated by the carriage or truck so that on the turning of the wheels of the said automobile the tires will be readily and quickly cleaned. On reversely throwing the lever 49 the brushes will be brought out of engagement with the tires on the wheels of the automobile.

From the foregoing description, taken in connection with the accompanying drawings, the construction and manner of operation of the device will be clearly understood, and therefore a more extended explanation has been omitted.

What is claimed is:—

1. In mechanism of the class described, front and rear pairs of inclined rails forming a track, the inclines of said rails being in the same direction with respect to each other, forwardly divergent guide rails spaced from and outside of said front rails, a truck having flanged wheels movable over the incline of said front and rear pairs of rails, a platform swingingly connected to the elevated ends of the rear pair of rails, a stationary bracket below said platform, pivotal break-jointed raising and lowering means connected with the brackets and the said platform, weighted means connected with the break-jointed means for holding the same in a position for normally elevating the platform, and a resiliently supported grab device located at the rearmost end of the truck.

2. In mechanism of the class described, front and rear pairs of inclined rails forming a track, the inclines of said rails being in the same direction with respect to each other, forwardly divergent guide rails spaced from and outside of said front rails, a truck having flanged wheels movable over the incline of said front and rear pairs of rails, a platform swingingly connected to the elevated ends of the rear pair of rails, a stationary bracket below said platform, pivotal break-jointed raising and lowering means connected with the brackets and the said platform, weighted means connected with the break-jointed means for holding the same in a position for normally elevating the platform, a resiliently supported grab device located at the rearmost end of the truck, and hand operable means connected with the weighted means and extended in position over the rear inclined rails for convenient reach by the operator of an automobile when resting upon the truck while in elevated position.

In testimony whereof I affix my signature in presence of two witnesses.

ANDREW A. WINER.

Witnesses:
J. W. AKIN,
F. W. DITTS.